J. J. DOWNEY.
TRAP.
APPLICATION FILED DEC. 23, 1914.
1,193,527.  Patented Aug. 8, 1916.
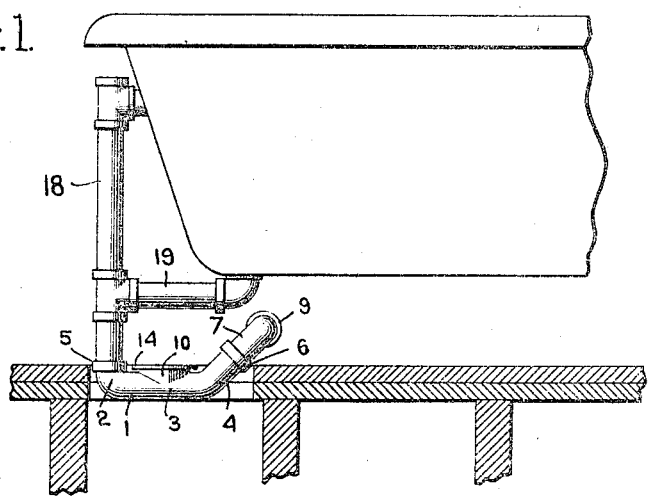
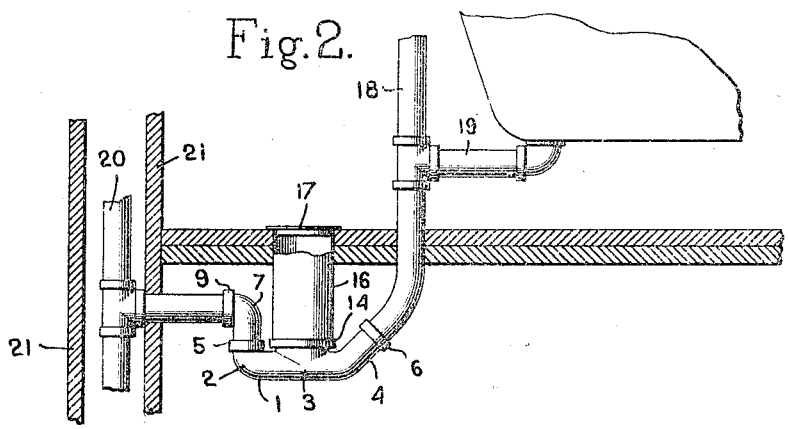
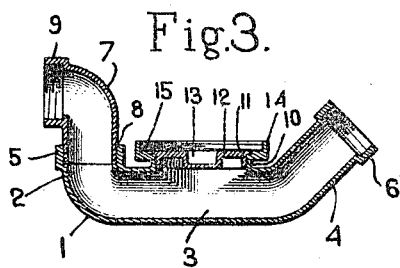
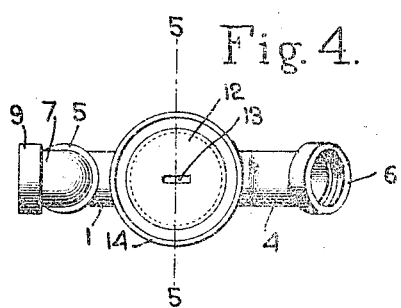
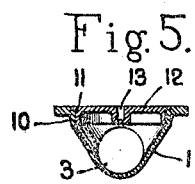
Witnesses.
J. Morrill Fuller
William E. Gogen
Inventor.
John J. Downey,
by Heard Smith & Tennant
Att'ys.

UNITED STATES PATENT OFFICE.

JOHN J. DOWNEY, OF ROSLINDALE, MASSACHUSETTS.

TRAP.

1,193,527.  Specification of Letters Patent.  Patented Aug. 8, 1916.

Application filed December 23, 1914. Serial No. 878,633.

*To all whom it may concern:*

Be it known that I, JOHN J. DOWNEY, a subject of the King of Great Britain, residing at Roslindale, county of Suffolk, State of Massachusetts, have invented an Improvement in Traps, of which the following description, in connection with the accompanying drawing, is a specification, like characters on the drawing representing like parts.

This invention relates to traps employed in conjunction with bath tubs, sinks, basins, etc., for the purpose of preventing ingress of noxious gases from plumbing connections to a sewerage system.

The use of traps now on the market is greatly restricted because of structural reasons. The present traps are relatively deep and their positioning is in the majority of cases governed not by desirability or efficiency but by feasibility. This is especially notable in cases of cement or reinforced concrete construction where sanitary equipment is altered or installed after erection and where too great a cutting out of the concrete slab will structurally weaken the floor. Trap installations are often practically controlled not by efficiency but to avoid joists, beams, spreaders or other structural obstacles and to meet certain angular adjustments both with respect to the waste piping and to the tub, basin, sink, to be connected thereto. The various state and municipal ordinances almost universally require a trap automatically and constantly sealed by a column of water of, at least, two inches and, further, the majority require that the clean-out be under water. The former is to prevent the rise of sewer gases into the sanitary equipment with attendant air pollution and the latter to function as an automatic danger signal should a leak develop adjacent the trap plug through the escape of water which is certain to be noted and repairs made.

The object of this novel and improved construction is to provide a sanitary trap which, while functionally conformable to the various plumbing ordinances, is of minimum permissible depth and is continuously water sealed.

Another object is to provide such a trap which is of maximum adjustability and is adapted to meet all structural conditions in installations either in original construction work or in subsequent equipment.

A further object is to provide an efficient trap, inexpensive to produce, of few parts composed of the minimum practical amount of material, and of the utmost simplicity of installation.

Still another object is to construct a trap which admits of facile cleansing, which obviates all sharp curves or abutments, or trap recesses where soil may collect and which retains the advantages of the common S-traps and "pot" or "drum" traps without their attendant disadvantages.

There has been illustrated in the accompanying drawings a selected embodiment of the improved trap which will now be described.

Figure 1 is an elevation of the trap, showing a mode of connecting the trap to a bathtub; Fig. 2 is an elevation of the trap, showing a different placement of the trap as connected to a bath-tub and also showing the clean-out extension tube; Fig. 3 is a vertical longitudinal section of the trap; Fig. 4 is a plan view of the trap; Fig. 5 is a section on the line 5—5, Fig. 4.

The trap, in this preferred form, consists of a pipe casting 1, having a substantially vertical arm 2 and, on the opposite side of the central chamber 3, an upwardly sloping arm 4. The outer ends of these arms 2 and 4 have flanges 5 and 6, respectively, which are internally threaded and are adapted, either one, to receive the elbow 7 similarly threaded at its end 8 and having at its other end the usual interiorly threaded flange 9. The top of the chamber 3 has a wide circular clean-out opening therein. The casting adjacent this opening is turned upwardly and backwardly forming the circumferential face 10 of the opening which bears threads 11 into which is adapted to be screwed the similarly threaded flat trap plug or cover 12. The cover 12 has therein an irregular depression, shown as the rectangular recess or slot 13. This is adapted to have inserted therein a suitable key to screw on or unscrew the cover, as, for example, a screw driver, end of a pair of pliers, etc. This pipe casting has also a continuation which forms the annular flange 14 which has threads 15 on its inner face and is adapted to receive a cylinder or extension tube 16 which has its lower end similarly and externally threaded making a water-tight joint. The tube 16 is adapted to have suitably secured thereon a top 17.

The extension tube 16, secured to the trap flange 14, is employed when the flooring depth admits of the concealment of the plumbing connections—as illustrated in Fig. 2. Under these conditions, the tube furnishes means of ready access to the trap for cleansing purposes. When flooring depth, or the proximity of structural supports, would prevent the desired placement of the present type of trap, this improved trap may be installed. In such installation, as shown in Fig. 1, the tube 16 is not employed and the trap casting is used without the flange 14, as shown in Fig. 5. The trap cover 12, in these circumstances, may be flush with the flooring surface even when there is presented a depth but slightly over two inches— the usual permissible minimum water-seal depth. This type is especially desirable in trap installation attendant upon the equipment with sanitary appliances of a room having a cement or concrete foundation and flooring where minimum depth of excavation is a prime factor both with respect to time and labor and to structural safety as, for example, in physicists' and chemists' laboratories, physicians' or dentists' offices, and barbers' and similar shops. In use with or without the extension tube 16, the trap is so constructed as to be installed flush with the floor so that, in case of stoppage of the trap, and leak in the cover, water will flow out upon the room floor where it will not cause damage instead of being discharged beneath the floor and injure the ceilings and objects below.

Two phases of the wide angular adjustability of both the inlet and the outlet of this trap are likewise shown in Figs. 1 and 2. By the employment of this novel trap, installation may be deferred until all piping is in place and it may be connected just previously to the laying of the floor. Either side of the trap may be used as the outlet by simply inserting the elbow 7. In Fig. 1, the elbow is shown secured to the sloping arm 4 of the trap and leading to a waste pipe located adjacent the tub side while the trap inlet is immediately beneath the tub overflow and outlet pipes 18 and 19. In Fig. 2, the elbow is shown secured to the arm 2 of the trap and leading to a waste pipe 20 in a partition 21. This adjustment exemplifies the adaptability of this trap in hidden or concealed plumbing construction.

It is obvious that this trap may be installed with its inlet placed in any desired position with relation to the overflow and waste outlets of a bath-tub or other similar sanitary appliance and likewise may its outlet be adjusted readily to accommodate any necessary or desired conditions of piping, flooring, or installation obstacles met with in such work.

The requisite water seal for the trap plug or cover 12 is always assured by the two arms 2 and 4 which effect the retention of a quantity of water sufficient to deny passage to noxious gases which tend to arise from the waste pipe system.

There is thus provided an easily cleansed, shallow, efficiently simple, widely adjustable, water-sealed trap without projections or recesses and which offers minimum resistance to the flushing, scouring flow of waste water.

While I have illustrated herein a selected embodiment of my invention I do not wish to be limited to the constructional features shown, except as claimed.

Having fully described my invention, what I claim as new and desire to secure by Letters Patent is:

1. A trap comprising a pipe section having a horizontal member, upwardly extending arms above the plane of the horizontal member and at different angles from the axis thereof adapted to form a water-seal, an expanded portion intermediate the ends of the horizontal member forming a circular seat, a cap for said seat and means for detachably securing the cap therein.

2. A trap comprising a pipe section, having a straight portion and angled continuations, said pipe continuations being upwardly inclined at different angles to the straight section whereby either end may be connected to the outlet or inlet connections and wide range of adjustability secured, said upwardly inclined continuations forming in conjunction with the straight portion, a water seal, the central portion of the straight section having an opening therein to afford access thereto, a cap hermetically to seal said opening, and means removably to secure said cap to said straight portion.

3. A trap comprising a shallow horizontal body portion having an opening in its top of greater diameter than the width of the body portion formed by vertically flared walls, upwardly extending arms above the plane of the horizontal portion and at different angles thereto and forming therewith a water-seal, a clean-out closure detachably secured in said opening below the trap water-line and adapted to afford easy access to the trap interior.

4. A trap formed by an integral pipe portion comprising a shallow horizontal section, an expanded portion in said section having an opening to said section of greater diameter than the diameter of the pipe portion, a clean-out closure for said opening, means for detachably securing said closure therein, integral continuations of said horizontal section upwardly extending above the plane of said section and at different angles to the axis thereof, said continuations forming a water-seal whereby said cleanout closure is below the water-level of the trap.

In testimony whereof, I have signed my name to this specification, in the presence of two subscribing witnesses.

JOHN J. DOWNEY.

Witnesses:
 MAURICE M. MOORE,
 THOMAS J. DRUMMOND.